United States Patent
Bao et al.

(10) Patent No.: US 12,339,802 B2
(45) Date of Patent: Jun. 24, 2025

(54) DESERIALIZER

(71) Applicant: LONTIUM SEMICONDUCTOR CORPORATION, Anhui (CN)

(72) Inventors: Shenghui Bao, Anhui (CN); Hui Bian, Anhui (CN); Fengyu Gao, Anhui (CN); Lei Li, Anhui (CN); Diansheng Ren, Anhui (CN); Jin Su, Anhui (CN)

(73) Assignee: LONTIUM SEMICONDUCTOR CORPORATION, Anhui (CN)

( * ) Notice: Subject to any disclaimer, the term of this patent is extended or adjusted under 35 U.S.C. 154(b) by 49 days.

(21) Appl. No.: 18/505,744

(22) Filed: Nov. 9, 2023

(65) Prior Publication Data

US 2024/0256481 A1 Aug. 1, 2024

(30) Foreign Application Priority Data

Jan. 28, 2023 (CN) .......................... 202310104267.4

(51) Int. Cl.
*G06F 13/42* (2006.01)
*H04N 5/268* (2006.01)

(52) U.S. Cl.
CPC ......... *G06F 13/4282* (2013.01); *H04N 5/268* (2013.01); *G06F 2213/0016* (2013.01)

(58) Field of Classification Search
CPC ..................... G06F 13/4282; G06F 2213/0016
See application file for complete search history.

(56) References Cited

U.S. PATENT DOCUMENTS 9,756,385 B1 * 9/2017 Oh ..................... H04N 21/4408
9,965,420 B2 * 5/2018 Liu ..................... G06F 13/4282
10,067,906 B2 * 9/2018 Lee ..................... G06F 11/0757
11,496,706 B2 * 11/2022 Bao ......................... H03M 9/00
2018/0181531 A1 * 6/2018 Foust ..................... G06F 13/36

(Continued)

FOREIGN PATENT DOCUMENTS

| CN | 101924884 A | 12/2010 |
| CN | 205071166 U | 3/2016 |
| CN | 209118769 U | 7/2019 |

(Continued)

OTHER PUBLICATIONS

Chinese Office Action regarding Application No. 202310104267.4, dated Mar. 27, 2023.

*Primary Examiner* — Henry Tsai
*Assistant Examiner* — Christopher A Daley
(74) *Attorney, Agent, or Firm* — Harness, Dickey & Pierce, P.L.C.

(57) ABSTRACT

A deserializer is provided. The deserializer includes a data receiver, an RCC transmitter, an I2C master, a command determination device, a video transmitter, a video processing device and an I2S transmitter. The data receiver analyzes raw data sent to the deserializer to obtain audio data, video data and/or command data. The I2S transmitter sends the audio data to the outside of the deserializer. The video processing equipment performs a format conversion on the video data and sends the video data to the outside of the deserializer. The command determination device determines the command data, and sends the command data to the outside of the deserializer in response to a determination result indicating that the command data is a deserializer external command.

9 Claims, 4 Drawing Sheets

(56) References Cited

U.S. PATENT DOCUMENTS

2024/0111619 A1\* 4/2024 Tao .................. G06F 11/079
2024/0323061 A1\* 9/2024 Niu ................. H04L 25/0272

FOREIGN PATENT DOCUMENTS

| CN | 112685355 A | 4/2021 |
| CN | 218100211 U | 12/2022 |
| JP | 2003/099073 A | 4/2003 |

\* cited by examiner

DESERIALIZER

CROSS-REFERENCE TO RELATED APPLICATION

This application claims the priority to Chinese Patent Application No. 202310104267.4, titled "DESERIALIZER", filed on Jan. 28, 2023 with the Chinese Patent Office, which is incorporated herein by reference in its entirety.

FIELD

The present disclosure relates to the field of communication technology, and in particular to a deserializer.

BACKGROUND

Usually, video data acquired by a video source is processed by a processor, and then displayed on a display screen. In practice, in the case of a long distance between the video source and the processor or a long distance between the processor and the display screen, a serializer and a deserializer are usually set on a transmission path to transmit the video data.

Reference is made to FIG. 1(a), which is a schematic diagram of a transmission path of video data. The video source may be a camera which is mounted at a rear of a vehicle and used to capture reverse images. The processor may be a central control system inside the vehicle. The video source is arranged at the rear of the vehicle, and thus the video source is far away from the processor. Therefore, the video data cannot transmit between the video source and the processor in a direct connection manner, and an additional module is required to be added between the video source and the processor to achieve long-distance transmission of the video data. In conventional solutions, a serializer and a deserializer are added between the video source and the processor. The video source, the serializer and the deserializer cannot operate immediately after the system is powered on, which need to be configured by the processor. Generally, an inter integrated circuit (I2C) interface is used for configuration. As shown in FIG. 1(a), the deserializer is close to the processor, which can be configured through the I2C interface in the direct connection manner. The video source and the serializer are far away from the processor, which cannot be configured through the I2C interface in the direct connection manner. In this case, the deserializer is required to process an I2C command and send the processed I2C command to the serializer through the transmission channel. The serializer analyzes and processes the I2C command, to configure the serializer and video source. The configuration of the serializer includes: an operating mode and an operating parameter of the serializer. The configuration of the video source includes: general configuration of the video source, by which the video source can operate normally. Reference is made to FIG. 1(b), which is a schematic diagram of another transmission path of video data. The video source and processor are close to each other, which both are far away from the display screen. In this case, the transmission data further includes audio data. The processor may be directly connected to the serializer through the I2C interface. The deserializer may be directly connected to the display screen through the I2C interface. The processor sends an I2C command to the remote deserializer through the serializer. The deserializer analyzes the I2C command and then performs corresponding configuration.

However, the conventional deserializer protocol cannot support bidirectional transmission on the same line, resulting in that deserializers with different internal structures are required to be adopted for the two situations of transmitting video data shown in FIG. 1(a) and FIG. 1(b) in the conventional technology. Therefore, the conventional deserializer cannot be flexibly applied.

SUMMARY

In view of this, a deserializer applicable to all application scenarios of deserializer is provided according to the present disclosure, to implement flexible application of the deserializer.

A deserializer includes a data receiver, an RCC transmitter, an I2C master, a command determination device, a video transmitter, a video processing device, and an I2S transmitter.

The data receiver is configured to receive raw data sent to the deserializer and analyze the raw data to obtain audio data, video data, and/or command data, where the data receiver supports various data formats.

The command determination device is connected to the data receiver, the RCC transmitter and the I2C master, and is configured to receive the command data outputted by the data receiver; determine whether the command data is a deserializer configuration command or a deserializer external command; configure, in response to a determination result indicating that the command data is the deserializer configuration command, the deserializer based on configuration content in the command data; and send, in response to a determination result indicating that the command data is the deserializer external command, the command data to an outside of the deserializer through the RCC transmitter or the I2C master.

The video processing device is connected to the data receiver and the video transmitter, and is configured to receive the video data outputted by the data receiver, perform a format conversion on the video data to obtain target video data, and send the target video data to the outside of the deserializer through the video transmitter, where the video transmitter supports various video formats.

The I2S transmitter is connected to the data receiver, and is configured to receive the audio data outputted by the data receiver and send the audio data to the outside of the deserializer, where the audio data is in I2S format.

In an embodiment, the data receiver includes an ADP receiver, an RCC receiver, and an I2C slave.

The ADP receiver is connected to the I2S transmitter, the video processing device and the command determination device; and is configured to receive the raw data, analyze the raw data to obtain the audio data, the video data and/or the command data, output the audio data to the I2S transmitter, output the video data to the video processing device, and output the command data to the command determination device.

The RCC receiver is connected to the command determination device, and is configured to convert the received raw data into command data in a RCC format and output the command data in the RCC format to the command determination device.

The I2C slave is connected to the command determination device, and is configured to convert the received raw data into command data in an I2C format and output the command data in the I2C format to the command determination device.

In an embodiment, the command determination device is further configured to, in a case of receiving the command data from the ADP receiver, send a reply signal to a sending end of the raw data through the RCC transmitter in response to the determination result indicating that the command data is the deserializer configuration command, and configure the deserializer based on configuration content in the command data; and send the command data to the outside of the deserializer through the I2C master, in response to the determination result indicating that the command data is the deserializer external command.

In an embodiment, the command determination device is further configured to, in a case of receiving the command data from the RCC receiver, send a reply signal to a sending end of the raw data through the RCC transmitter in response to the determination result indicating that the command data is the deserializer configuration command, and configure the deserializer based on configuration content in the command data; and send the command data to the outside of the deserializer through the I2C master, in response to the determination result indicating that the command data is the deserializer external command.

In an embodiment, the command determination device is further configured to, in a case of receiving the command data from the I2C slave, send a reply signal to a sending end of the raw data through the I2C slave in response to the determination result indicating that the command data is the deserializer configuration command, and configure the deserializer based on configuration content in the command data; and send the command data to the outside of the deserializer through the RCC receiver, in response to the determination result indicating that the command data is the deserializer external command.

In an embodiment, the video transmitter includes an MIPI transmitter.

The video processing device is further configured to convert the video data into video data in an MIPI format, and send the video data in the MIPI format to the outside of the deserializer through the MIPI transmitter.

In an embodiment, the video transmitter includes an LVDS transmitter.

The video processing device is further configured to convert the video data into video data in an LVDS format, and send the video data in the LVDS format to the outside of the deserializer through the LVDS transmitter.

In an embodiment, the video transmitter includes a TTL transmitter.

The video processing device is further configured to convert the video data into video data in a TTL format, and send the video data in the TTL format to the outside of the deserializer through the TTL transmitter.

In an embodiment, the video transmitter includes an EDP transmitter.

The video processing device is further configured to convert the video data into video data in an EDP format, and send the video data in the EDP format to the outside of the deserializer through the EDP transmitter.

Thus, based on the above technical solutions, a deserializer is provided according to the present disclosure. The deserializer includes a data receiver, an RCC transmitter, an I2C master, a command determination device, a video transmitter, a video processing device and an I2S transmitter. The data receiver receives raw data sent to the deserializer and analyzes the raw data to obtain audio data, video data and/or command data. The command determination device receives the command data outputted by the data receiver; determines whether the command data is a deserializer configuration command or a deserializer external command; configures, in response to a determination result indicating that the command data is the deserializer configuration command, the deserializer based on configuration content in the command data; and sends, in response to a determination result indicating that the command data is the deserializer external command, the command data to the outside of the deserializer through the RCC transmitter or the I2C master. The video processing device receives the video data outputted by the data receiver, performs a format conversion on the video data to obtain target video data, and sends the target video data to the outside of the deserializer through the video transmitter. The I2S transmitter receives the audio data sent by the data receiver and sends the audio data to the outside of the deserializer. It can be seen that with the deserializer according to the present disclosure, various types of data including the audio data, the video data and/or the command data can be transmitted. In addition, the data receiver supports various data formats, and the video transmitter supports various video formats. Therefore, the deserializer according to the present disclosure is applicable to all application scenarios of deserializer, to implement flexible application of the deserializer.

BRIEF DESCRIPTION OF THE DRAWINGS

In order to more clearly describe the technical solutions in the embodiments of the present disclosure or the technical solutions in the conventional technology, drawings to be used in the description of the embodiments or the conventional technology are briefly described hereinafter. It is apparent that the drawings described below are merely used for describing the embodiments of the present disclosure, and those skilled in the art may obtain other drawings according to the provided drawings without any creative effort.

DETAILED DESCRIPTION OF EMBODIMENTS

Figure 1:
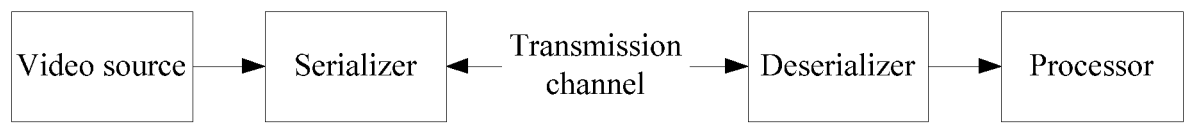
FIG. 1(a) is a schematic diagram of a transmission path of video data according to the conventional technology.
FIG. 1(b) is a schematic diagram of another transmission path of video data according to the conventional technology.
Figure 1:
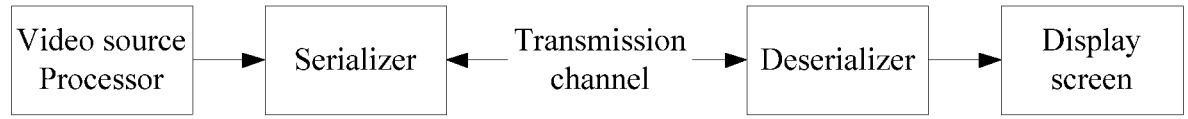

Technical solutions of embodiments of the present disclosure are described below clearly and completely in conjunction with the drawings of the embodiments of the present disclosure. Apparently, the embodiments described below are only some embodiments of the present disclosure, rather than all the embodiments. Any other embodiments obtained by those skilled in the art based on the embodiments in the present disclosure without any creative effort fall within the protection scope of the present disclosure.

In order to facilitate understanding the technical solutions to be protected by the present disclosure, English abbreviations involves in the present disclosure are explained as follows.

LVDS refers to low-voltage-differential-signaling, which is a unified video transmission protocol in the industry.

TTL refers to transistor-transistor logic, which is a unified video transmission protocol in the industry.

MIPI refers to mobile industry processor interface, which is a unified video transmission protocol in the industry.

EDP refers to embedded display port, which is a unified video transmission protocol in the industry.

I2S refers to inter IC sound, which is a unified audio transmission protocol in the industry.

I2C refers to inter integrated circuit, which is a unified communication protocol in the industry. A master is configured to send a command, and a slave is configured to receive the command. The master may send a command to the slave, and the slave may reply the date to the master based on a type of the command.

ADP refers to automotive display port, which is a customized data integration transmission protocol belonging to a high-speed signal protocol and using a physical layer and a protocol layer.

RCC refers to reverse control channel, which is a data control transmission protocol defined by Applicant's company, which is a low-speed data protocol and may be used for directly analyzing and processing serial data.

A deserializer is provided according to the embodiments of the present disclosure. The deserializer includes a data receiver, an RCC transmitter, an I2C master, a command determination device, a video transmitter, a video processing device and an I2S transmitter. The data receiver receives raw data sent to the deserializer and analyzes the raw data to obtain audio data, video data and/or command data. The command determination device receives the command data outputted by the data receiver; determines whether the command data is a deserializer configuration command or a deserializer external command; configures, in response to a determination result indicating that the command data is the deserializer configuration command, the deserializer based on configuration content in the command data; and sends, in response to a determination result indicating that the command data is the deserializer external command, the command data to the outside of the deserializer through the RCC transmitter or the I2C master. The video processing device receives the video data outputted by the data receiver, performs a format conversion on the video data to obtain target video data, and sends the target video data to the outside of the deserializer through the video transmitter. The I2S transmitter receives the audio data from the data receiver and sends the audio data to the outside of the deserializer. It can be seen that with the deserializer according to the present disclosure, various types of data including the audio data, the video data and/or the command data can be transmitted. In addition, the data receiver supports various data formats, and the video transmitter supports various video formats. Therefore, the deserializer according to the present disclosure is applicable to all application scenarios of deserializer, to implement flexible application of the deserializer.

Figure 2:
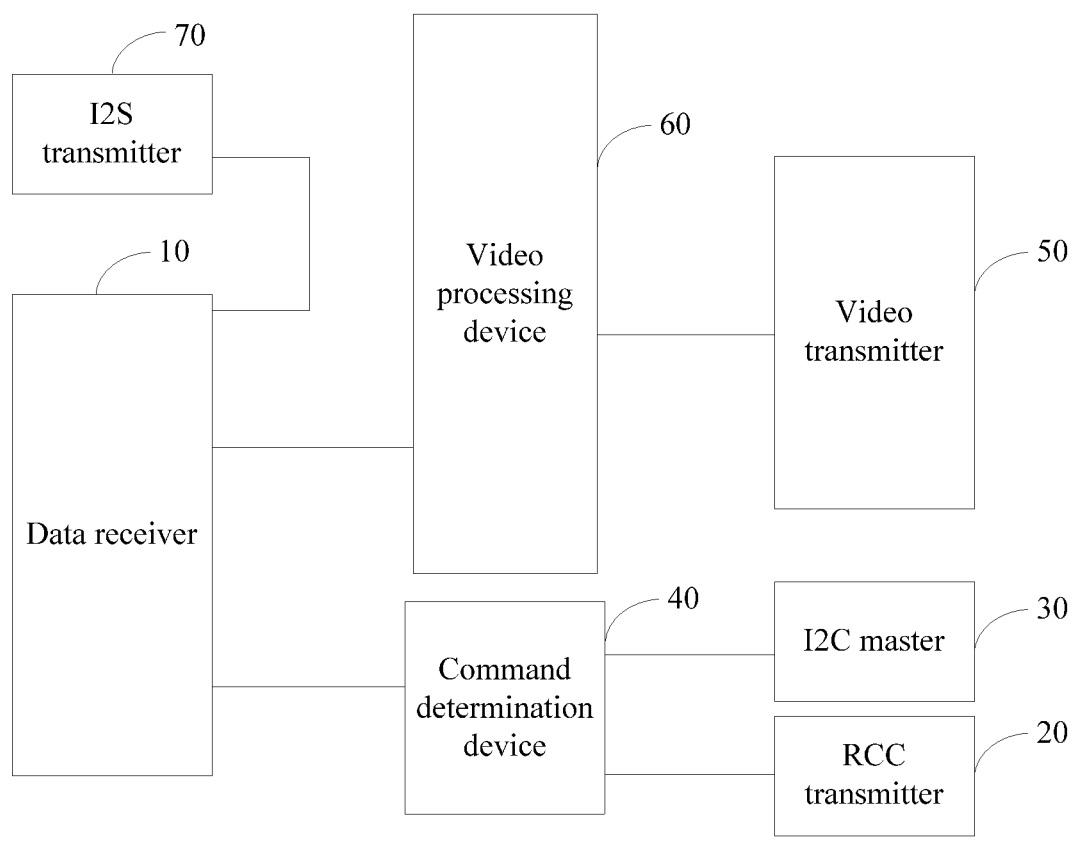
FIG. 2 is a schematic structural diagram of a deserializer according to an embodiment of the present disclosure.

Referring to FIG. 2, a schematic structural diagram of a deserializer is shown according to an embodiment of the present disclosure. The deserializer includes a data receiver 10, an RCC transmitter 20, an I2C master 30, a command determination device 40, a video transmitter 50, a video processing device 60, and an I2S transmitter 70.

The data receiver 10 is configured to receive raw data sent to the deserializer, and analyze the raw data to obtain audio data, video data, and/or command data.

In practice, the raw data received by the data receiver 10 may be sent by a serializer. The raw data may include any one, any two or all of audio data, video data and command data.

The data receiver 10 supports various data formats, such as an ADP data format, a RCC data format, and an I2C data format.

The command determination device 40 is connected to the data receiver 10, the RCC transmitter 20 and the I2C master 30. The command determination device 40 is configured to receive the command data outputted by the data receiver 10; determine whether the command data is a deserializer configuration command or a deserializer external command; configure, in response to a determination result indicating that the command data is the deserializer configuration command, the deserializer based on configuration content in the command data, and send, in response to a determination result indicating that the command data is the deserializer external command, the command data to the outside of the deserializer through the RCC transmitter 20 or the I2C master 30.

In practice, different identifications may be set for the deserializer configuration command and the deserializer external command respectively. The command determination device 40 determines whether the command data is the deserializer configuration command or the deserializer external command by identifying the identifications.

The video processing device 60 is connected to the data receiver 10 and the video transmitter 50. The video processing device 60 is configured to receive the video data outputted by the data receiver 10, perform a format conversion on the video data to obtain target video data, and send the target video data to the outside of the deserializer through the video transmitter.

The video transmitter 50 in the present disclosure supports various video formats, such as an MIPI format, an LVDS format, a TTL format, and an EDP format.

The I2S transmitter 70 is connected to the data receiver 10. The I2S transmitter 70 is configured to receive the audio data outputted by the data receiver 10 and send the audio data to the outside of the deserializer.

The audio data is in an I2S format.

That is, the raw data includes audio data in the I2S format. The data receiver 10 analyzes the raw data to obtain audio data in the I2S format and outputs the audio data in the I2S format to the I2S transmitter 70.

In summary, a deserializer is provided according to the present disclosure. The deserializer includes a data receiver 10, an RCC transmitter 20, an I2C master 30, a command determination device 40, a video transmitter 50, a video processing device 60 and an I2S transmitter 70. The data receiver 10 receives raw data sent to the deserializer and analyzes the raw data to obtain audio data, video data and/or command data. The command determination device 40 receives the command data outputted by the data receiver 10; determines whether the command data is a deserializer configuration command or a deserializer external command; configures, in response to a determination result indicating that the command data is the deserializer configuration command, the deserializer based on configuration content in the command data; and sends, in response to a determination result indicating that the command data is the deserializer external command, the command data to the outside of the deserializer through the RCC transmitter 20 or the I2C master 30. The video processing device 60 receives the video data outputted by the data receiver 10, performs a format conversion of the video data to obtain target video data, and sends the target video data to the outside of the deserializer through the video transmitter. The I2S transmitter 70 receives the audio data sent by the data receiver 10 and sends the audio data to the outside of the deserializer. It can be seen that with the deserializer according to the present disclosure, various types of data including the audio data, the video data and/or the command data can be transmitted. In addition, the data receiver 10 supports various data formats, and the video transmitter 50 supports various video formats. Therefore, the deserializer according to the present disclosure is applicable to all application scenarios of deserializer, to implement flexible application of the deserializer.

Figure 3:
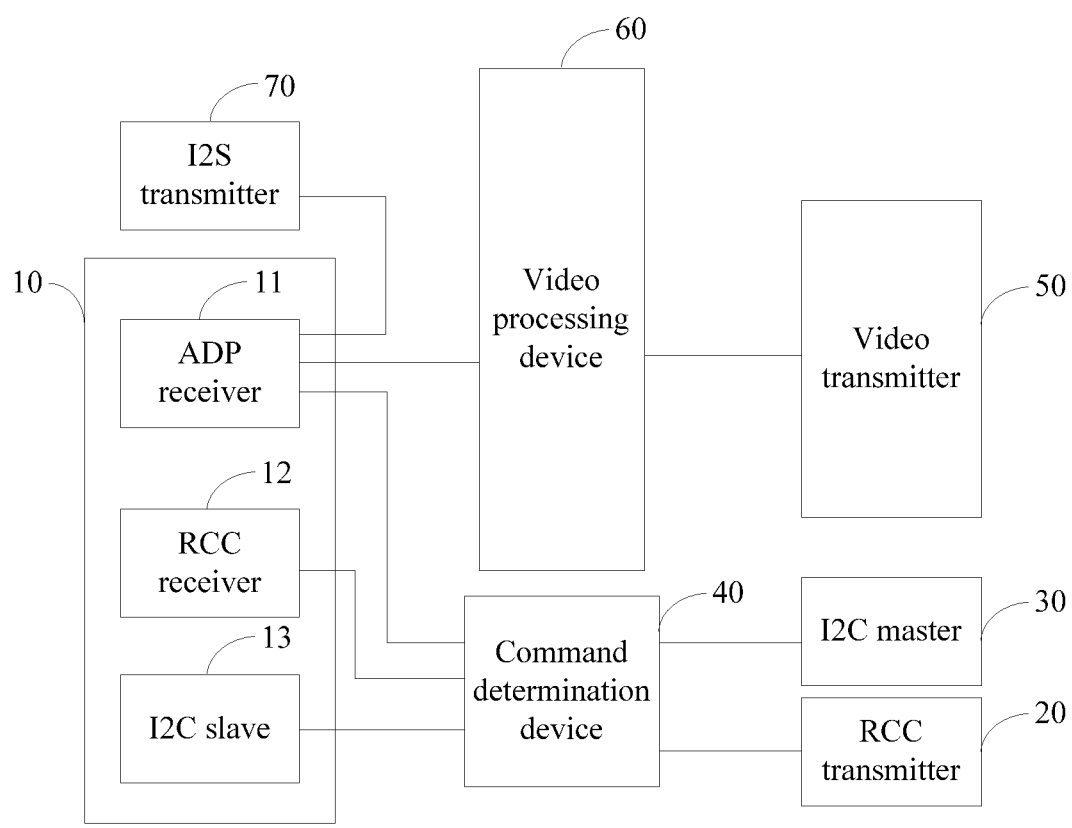
FIG. 3 is a schematic structural diagram of a deserializer according to another embodiment of the present disclosure.

In order to further optimize the above embodiments, referring to FIG. 3, a schematic structural diagram of a deserializer is shown according to another embodiment of the present disclosure. Based on the embodiment shown in FIG. 2, the data receiver 10 may include an ADP receiver 11, an RCC receiver 12, and an I2C slave 13.

The ADP receiver 11 is connected to the I2S transmitter 70, the video processing device 60 and the command determination device 40. The ADP receiver 11 is configured to receive the raw data sent to the deserializer; analyze the raw data to obtain the audio data, the video data and/or the command data; output the audio data to the I2S transmitter 70; output the video data to the video processing device 60; and output the command data to the command determination device 40.

The RCC receiver 12 is connected to the command determination device 40. The RCC receiver 12 is configured to convert the received raw data into command data in a RCC format and output the command data in the RCC format to the command determination device 40.

The I2C slave 13 is connected to the command determination device 40. The I2C slave 13 is configured to convert the received raw data into command data in an I2C format and output the command data in the I2C format to the command determination device 40.

Based on the embodiment shown in FIG. 2, the command determination device 40 may further be configured to, in a case of receiving the command data outputted by the ADP receiver 11, send a reply signal to a sending end of the raw data through the RCC transmitter 20 in response to the determination result indicating that the command data is the deserializer configuration command, and configure the deserializer based on configuration content in the command data; and send the command data to the outside of the deserializer through the I2C master 30, in response to the determination result indicating that the command data is the deserializer external command.

In order to further implement the above embodiments, the command determination device 40 may further be configured to, in a case of receiving the command data outputted by the RCC receiver 12, send a reply signal to a sending end of the raw data through the RCC transmitter 20 in response to the determination result indicating that the command data is the deserializer configuration command, and configure the deserializer based on configuration content in the command data; and send the command data to the outside of the deserializer through the I2C master 30, in response to the determination result indicating that the command data is the deserializer external command.

In order to further implement the above embodiments, the command determination device 40 may further be configured to, in a case of receiving the command data outputted by the I2C slave 13, send a reply signal to a sending end of the raw data through the I2C slave 13 in response to the determination result indicating that the command data is the deserializer configuration command, and configure the deserializer based on configuration content in the command data; and send the command data to the outside of the deserializer through the RCC receiver 12, in response to the determination result indicating that the command data is the deserializer external command.

In summary, a deserializer is provided according to the present disclosure. The deserializer includes a data receiver 10, an RCC transmitter 20, an I2C master 30, a command determination device 40, a video transmitter 50, a video processing device 60, and an I2S transmitter 70. The data receiver 10 includes an ADP receiver 11, an RCC receiver 12 and an I2C slave 13. With the deserializer according to the present disclosure, various types of data including the audio data, the video data and/or the command data can be transmitted. In addition, the data receiver 10 supports various data formats, and the video transmitter 50 supports various video formats. Therefore, the deserializer according to the present disclosure is applicable to all application scenarios of deserializer, to implement flexible application of the deserializer.

The video transmitter 50 in the present disclosure supports various video formats. Therefore, In order to further implement the above embodiments, referring to FIG. 4, a schematic structural diagram of a deserializer is shown according to another embodiment of the present disclosure. On the basis of FIG. 2 or FIG. 3, the video transmitter 50 may include an MIPI transmitter 51.

The video processing device 60 may further be configured to convert the video data into video data in an MIPI format, and send the video data in the MIPI format to the outside of the deserializer through the MIPI transmitter 51.

Figure 4:
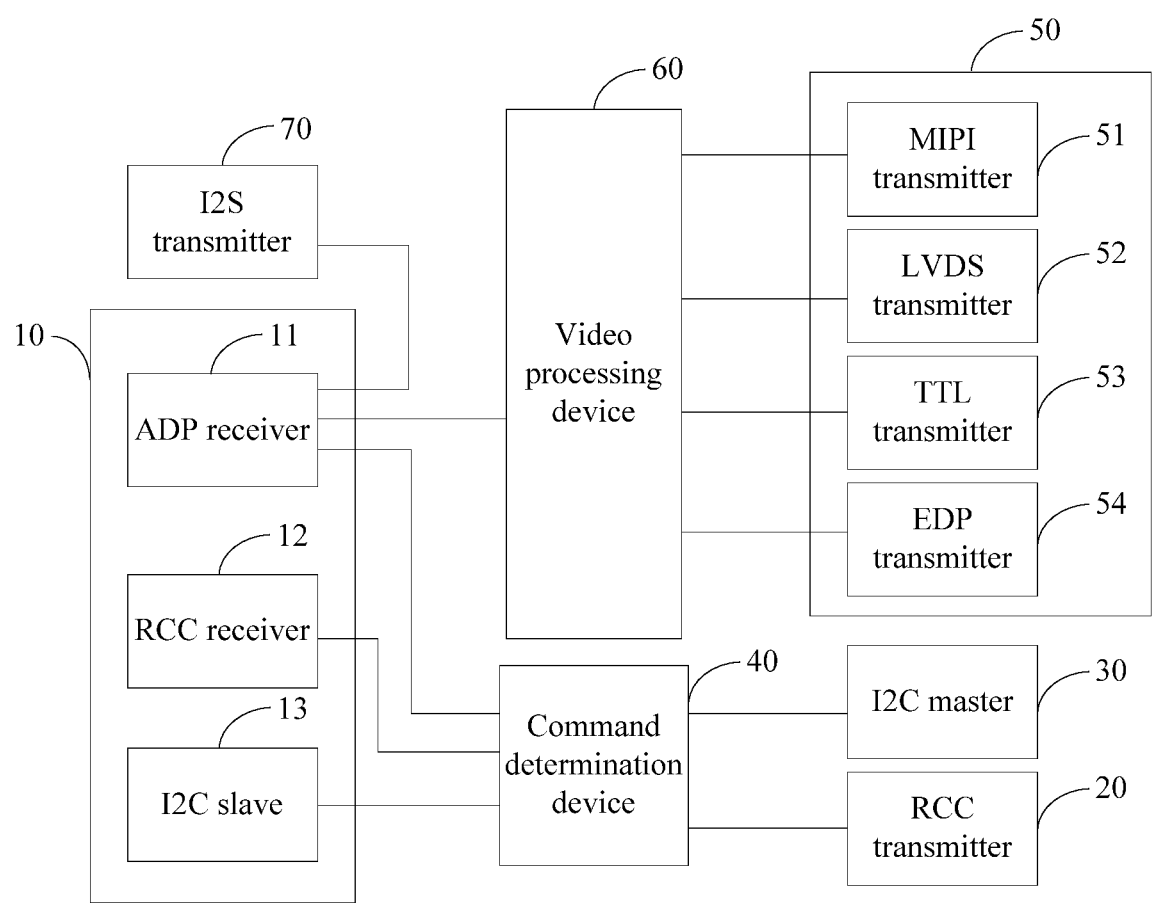
FIG. 4 is a schematic structural diagram of a deserializer according to another embodiment of the present disclosure.

It should be particularly noted that FIG. 4 only shows the deserializer based on the embodiment shown in FIG. 3.

In order to further implement the above embodiments, the video transmitter 50 may include an LVDS transmitter 52.

The video processing device 60 is further configured to convert the video data into video data in an LVDS format, and send the video data in the LVDS format to the outside of the deserializer through the LVDS transmitter 52.

In order to further optimize the above embodiments, the video transmitter 50 may further include a TTL transmitter 53.

The video processing device 60 is further configured to convert the video data into video data in a TTL format, and send the video data in the TTL format to the outside of the deserializer through the TTL transmitter 53.

In order to further implement the above embodiments, the video transmitter 50 may further include an EDP transmitter 54.

The video processing device 60 is further configured to convert the video data into video data in an EDP format, and send the video data in the EDP format to the outside of the deserializer through the EDP transmitter 54.

In practice, the video transmitter 50 includes, but is not limited to, the MIPI transmitter 51, the LVDS transmitter 52, the TTL transmitter 53 and the EDP transmitter 54. The transmission format of the video data depends on actual needs, and is not limited in the present disclosure.

In summary, a deserializer is provided according to the present disclosure. The deserializer includes a data receiver 10, an RCC transmitter 20, an I2C master 30, a command determination device 40, a video transmitter 50, a video processing device 60, and an I2S transmitter 70. The data receiver 10 includes an ADP receiver 11, an RCC receiver 12 and an I2C slave 13. The video transmitter 50 supports various video formats. The video transmitter 50 includes an MIPI transmitter 51, an LVDS transmitter 52, a TTL transmitter 53 and an EDP transmitter 54. With the deserializer according to the present disclosure, various types of data including the audio data, the video data and/or the command data can be transmitted. In addition, the data receiver 10 supports various data formats, and the video transmitter 50 supports various video formats. Therefore, the deserializer according to the present disclosure is applicable to all application scenarios of deserializer, to implement flexible application of the deserializer.

Finally, it should be further noted that the relationship terms herein such as "first", "second" and the like are only used to distinguish one entity or operation from another entity or operation, rather than necessitate or imply that any such actual relationship or order exists between these entities or operations. Moreover, the terms "comprise", "include", or any other variants thereof are intended to encompass a non-exclusive inclusion, such that the process, method, article, or device including a series of elements includes not only those elements but also those elements that are not explicitly listed, or the elements that are inherent to such process, method, article, or device. Unless explicitly limited, the statement "including a . . . " does not exclude the case that other similar elements may exist in the process, the method, the article or the device other than enumerated elements.

The embodiments in this specification are described in a progressive manner. Each of the embodiments is mainly focused on describing its differences from other embodiments, and references may be made among these embodiments with respect to the same or similar parts.

The above description of the disclosed embodiments enables those skilled in the art to implement or use the present disclosure. Various modifications to the embodiments are apparent to those skilled in the art, and the general principle defined herein can be implemented in other embodiments without departing from the spirit or scope of the present disclosure. Hence, the present disclosure is not limited to the embodiments disclosed herein, but is to conform to the widest scope in accordance with the principles and novel features disclosed herein.

The invention claimed is:

1. A deserializer, comprising a data receiver, a reverse control channel (RCC) transmitter, an inter integrated circuit (I2C) master, a command determination device, a video transmitter, a video processing device, and an inter IC sound (I2S) transmitter, wherein
   the data receiver is configured to receive raw data sent to the deserializer, and analyze the raw data to obtain audio data, video data, and/or command data, wherein the data receiver supports multiple data formats;
   the command determination device is connected to the data receiver, the RCC transmitter and the I2C master; and is configured to receive the command data outputted by the data receiver; determine whether the command data is a deserializer configuration command or a deserializer external command; configure, in response to a determination result indicating that the command data is the deserializer configuration command, the deserializer based on configuration content in the command data, and send, in response to a determination result indicating that the command data is the deserializer external command, the command data to an outside of the deserializer through the RCC transmitter or the I2C master;
   the video processing device is connected to the data receiver and the video transmitter, and is configured to receive the video data outputted by the data receiver, perform a format conversion on the video data to obtain target video data, and send the target video data to the outside of the deserializer through the video transmitter, wherein the video transmitter supports multiple video formats; and
   the I2S transmitter is connected to the data receiver, and is configured to receive the audio data outputted by the data receiver and send the audio data to the outside of the deserializer, wherein the audio data is in an I2S format.

2. The deserializer according to claim 1, wherein the data receiver comprises an automotive display port (ADP) receiver, an RCC receiver, and an I2C slave, wherein
   the ADP receiver is connected to the I2S transmitter, the video processing device and the command determination device, and is configured to receive the raw data, analyze the raw data to obtain the audio data, the video data and/or the command data, output the audio data to the I2S transmitter, output the video data to the video processing device, and output the command data to the command determination device;
   the RCC receiver is connected to the command determination device, and is configured to convert the received raw data into command data in a RCC format and output the command data in the RCC format to the command determination device; and
   the I2C slave is connected to the command determination device, and is configured to convert the received raw data into command data in an I2C format and output the command data in the I2C format to the command determination device.

3. The deserializer according to claim 2, wherein the command determination device is further configured to:
   in a case of receiving the command data outputted by the ADP receiver,
      in response to the determination result indicating that the command data is the deserializer configuration command, send a reply signal to a sending end of the raw data through the RCC transmitter and configure the deserializer based on configuration content in the command data; and
      in response to the determination result indicating that the command data is the deserializer external command, send the command data to the outside of the deserializer through the I2C master.

4. The deserializer according to claim 2, wherein the command determination device is further configured to:
   in a case of receiving the command data outputted by the RCC receiver,
      in response to the determination result indicating that the command data is the deserializer configuration command, send a reply signal to a sending end of the raw data through the RCC transmitter and configure the deserializer based on configuration content in the command data; and
      in response to the determination result indicating that the command data is the deserializer external command, send the command data to the outside of the deserializer through the I2C master.

5. The deserializer according to claim 2, wherein the command determination device is further configured to:
   in a case of receiving the command data outputted by the I2C slave,
      in response to the determination result indicating that the command data is the deserializer configuration command, send a reply signal to a sending end of the raw data through the I2C slave and configure the deserializer based on configuration content in the command data; and in response to the determination result indicating that the command data is the deserializer external command, send the command data to the outside of the deserializer through the RCC receiver.

6. The deserializer according to claim 1, wherein the video transmitter comprises an mobile industry processor interface (MIPI) transmitter; and the video processing device is further configured to convert the video data into video data in an MIPI format, and send the video data in the MIPI format to the outside of the deserializer through the MIPI transmitter.

7. The deserializer according to claim 1, wherein the video transmitter comprises a low-voltage-differential-signaling (LVDS) transmitter; and the video processing device is further configured to convert the video data into video data in an LVDS format, and send the video data in the LVDS format to the outside of the deserializer through the LVDS transmitter.

8. The deserializer according to claim 1, wherein the video transmitter comprises a transistor-transistor logic (TTL) transmitter; and the video processing device is further configured to convert the video data into video data in a TTL format, and send the video data in the TTL format to the outside of the deserializer through the TTL transmitter.

9. The deserializer according to claim 1, wherein the video transmitter comprises an embedded display port (EDP) transmitter; and the video processing device is further configured to convert the video data into video data in an EDP format, and send the video data in the EDP format to the outside of the deserializer through the EDP transmitter.

* * * * *